US010872348B1

(12) United States Patent
Allen et al.

(10) Patent No.: US 10,872,348 B1
(45) Date of Patent: Dec. 22, 2020

(54) DETERMINING STATUS OF BUILDING MODIFICATIONS USING INFORMATICS SENSOR DATA

(71) Applicant: United Services Automobile Association (USAA), San Antonio, TX (US)

(72) Inventors: Michael J. Allen, San Antonio, TX (US); Ramsey Devereaux, San Antonio, TX (US); Spencer Read, Helotes, TX (US); David S. Franck, San Antonio, TX (US); Teddy J. Voutour, Helotes, TX (US); Shanna Limas, San Antonio, TX (US); William Chandler, San Antonio, TX (US); Michael P. Burns, San Antonio, TX (US); Daniela Wheeler, Boerne, TX (US); Kathleen L. Swain, Peoria, AZ (US); Cleburne R. Burgess, Fair Oaks Ranch, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 16/715,980

(22) Filed: Dec. 16, 2019

Related U.S. Application Data

(63) Continuation of application No. 14/273,918, filed on May 9, 2014, now Pat. No. 10,552,911.

(60) Provisional application No. 61/948,192, filed on Mar. 5, 2014, provisional application No. 61/943,906, filed on Feb. 24, 2014, provisional application No. 61/943,901, filed on Feb. 24, 2014, provisional application No. 61/943,897, filed on Feb. 24, 2014, provisional application No. 61/926,532, filed on Jan. 13, 2014, provisional application No. 61/926,534, filed on Jan. 13, 2014, provisional application No.

(Continued)

(51) Int. Cl.
*G06Q 30/00* (2012.01)
*G06Q 30/02* (2012.01)
*G06Q 40/08* (2012.01)

(52) U.S. Cl.
CPC ........ *G06Q 30/0215* (2013.01); *G06Q 40/08* (2013.01)

(58) Field of Classification Search
CPC ................................................. G06Q 30/0215
USPC ............................................................ 705/4
See application file for complete search history.

(56) References Cited

U.S. PATENT DOCUMENTS

| 2002/0129001 | A1* | 9/2002 | Levkoff | .................. G06F 30/13 |
| 2005/0055248 | A1* | 3/2005 | Helitzer | ................. G06Q 40/08 |
| | | | | 705/4 |
| 2014/0279593 | A1* | 9/2014 | Pershing | .............. G06Q 50/163 |
| | | | | 705/314 |

OTHER PUBLICATIONS

IP.com Prior Art Database Technical Disclosure (Year: 2008).*

* cited by examiner

*Primary Examiner* — Bruce I Ebersman
*Assistant Examiner* — John A Anderson
(74) *Attorney, Agent, or Firm* — Fletcher Yoder, PC

(57) ABSTRACT

A computer device and method for processing data to detect modifications to insured property. Received is specification data regarding modifications to be made to insured property in connection with an insurance claim. Also received is data from one or more sensor devices associated with the insured property indicative of a status regarding modifications made to the insured property. Analysis is performed on the (Continued)

received specification and data to determine whether one or more predefined conditions for the insurance claim is satisfied regarding the modifications to be made to the insured property.

17 Claims, 4 Drawing Sheets

Related U.S. Application Data

61/926,541, filed on Jan. 13, 2014, provisional application No. 61/926,536, filed on Jan. 13, 2014, provisional application No. 61/926,095, filed on Jan. 10, 2014, provisional application No. 61/926,098, filed on Jan. 10, 2014, provisional application No. 61/926,091, filed on Jan. 10, 2014, provisional application No. 61/926,093, filed on Jan. 10, 2014, provisional application No. 61/926,114, filed on Jan. 10, 2014, provisional application No. 61/926,103, filed on Jan. 10, 2014, provisional application No. 61/926,111, filed on Jan. 10, 2014, provisional application No. 61/926,108, filed on Jan. 10, 2014, provisional application No. 61/926,123, filed on Jan. 10, 2014, provisional application No. 61/926,121, filed on Jan. 10, 2014, provisional application No. 61/926,119, filed on Jan. 10, 2014, provisional application No. 61/926,118, filed on Jan. 10, 2014.

DETERMINING STATUS OF BUILDING MODIFICATIONS USING INFORMATICS SENSOR DATA

CROSS REFERENCE TO RELATED APPLICATIONS

This application claims priority to U.S. patent application Ser. No. 14/273,918 filed May 9, 2014; 61/926,093 filed Jan. 10, 2014; 61/926,091 filed Jan. 10, 2014; 61/926,095 filed Jan. 10, 2014; 61/926,098 filed Jan. 10, 2014; 61/926,103 filed Jan. 10, 2014; 61/926,108 filed Jan. 10, 2014; 61/926,111 filed Jan. 10, 2014; 61/926,114 filed Jan. 10, 2014; 61/926,118 filed Jan. 10, 2014; 61/926,119 filed Jan. 10, 2014; 61/926,121 filed Jan. 10, 2014; 61/926,123 filed Jan. 10, 2014; 61/926,536 filed Jan. 13, 2014; 61/926,541 filed Jan. 13, 2014; 61/926,534 filed Jan. 13, 2014; 61/926,532 filed Jan. 13, 2014; 61/943,897 filed Feb. 24, 2014; 61/943,901 filed Feb. 24, 2014; 61/943,906 filed Feb. 24, 2014; and 61/948,192 filed Mar. 5, 2014 which are each incorporated herein by reference in its entirety.

FIELD OF THE INVENTION

The disclosed embodiments generally relate to a method and computerized system for managing insurance and related products and services, and more particularly, to determining the status of modifications to a building or other structure using informatics sensor data.

BACKGROUND OF THE INVENTION

Smart home functionality is a maturing space, but the opportunity for insurance companies remains largely untapped. Currently, there are few useful early warning and loss mitigation systems that actually save costs and time for both the property owner and insurance company alike. For instance, currently, homeowners insurance claim events are detected by the homeowner, who then contacts their insurance company to inform them that there has been a loss. However, the loss could be mitigated with automated warning and detection systems that interface with the insurance company systems. For example, homeowners may not become aware of various issues/damage resulting from home repairs/remodeling until such time as those issues lead to further damage. If they could be made aware of such loss events earlier and then take corrective actions, then the increased damage or loss could have been mitigated or avoided.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, provided is a computer device and method for processing data to detect modifications to a building or other structure preferably associated with an insurance claim. Received is specification data regarding modifications to be made to a building or other structure in connection with an insurance claim. Also received is data from one or more sensor devices associated with the insured property indicative of a status of modifications made to the property. Analysis is performed on the received specification and data to determine whether one or more predefined conditions for the insurance claim is satisfied regarding the modifications to be made to the insured property.

In another aspect, a determination is performed regarding whether recoverable depreciation relating to an insurance claim can be provided to an insured based upon the performed analysis. In yet another aspect, data is received from the one or more sensor devices identifying one or more conditions on the insured property not associated with the modifications to be made to the property in connection with the insurance claim so as to determine one or more of: an underwriting decision, pricing decision; a renewal or cancellation decision, an insurance application decision, coverage amount, deductible, or other terms or conditions of an insurance policy or other product.

This summary section is provided to introduce a selection of concepts in a simplified form that are further described subsequently in the detailed description section. This summary section is not intended to identify key features or essential features of the claimed subject matter, nor is it intended to be used to limit the scope of the claimed subject matter.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
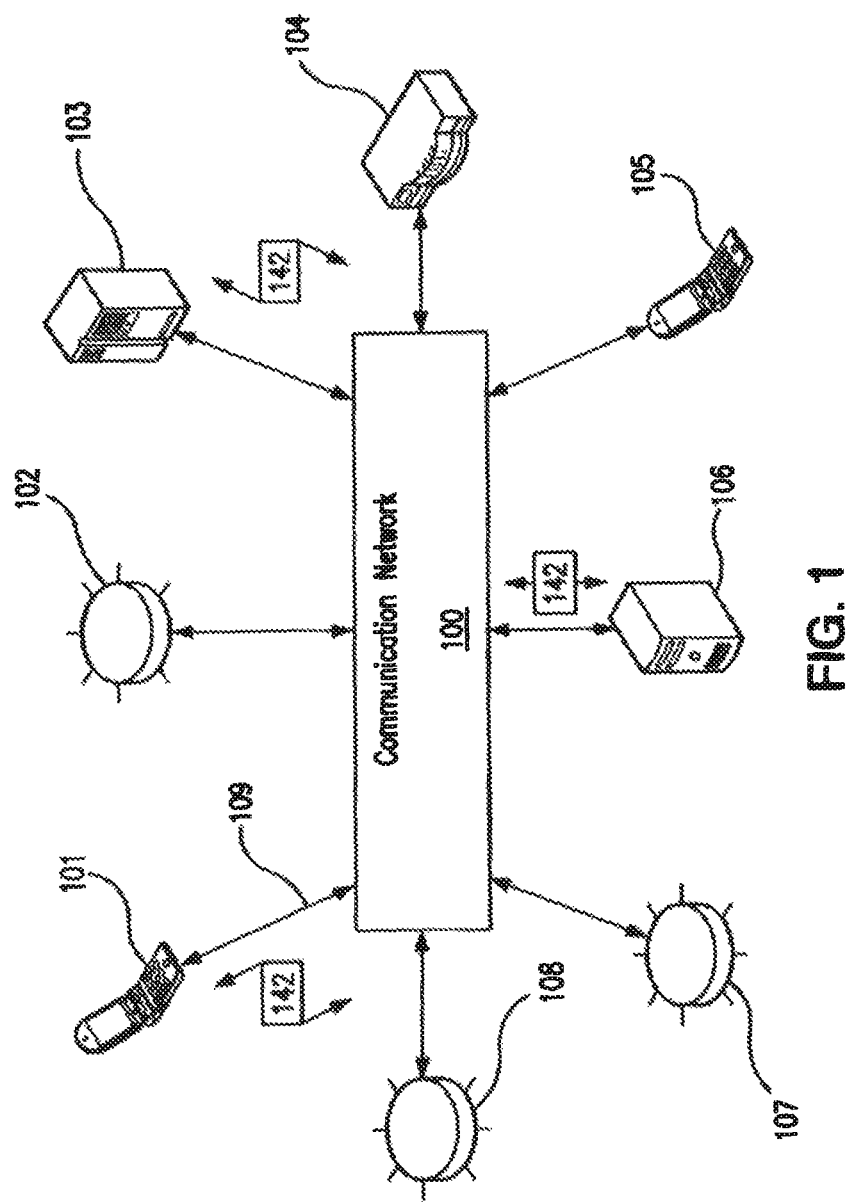
FIG. 1 illustrates an example communication network in accordance with an illustrated embodiment.

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims. All publications and references cited herein are expressly incorporated herein by reference in their entirety. For instance, commonly assigned U.S. Pat. Nos. 8,289,160 and 8,400,299 are related to certain embodiments described here and are each incorporated herein by reference in their entirety.

As used herein, the term "insurance" refers to a contract between an insurer, also known as an insurance company, and an insured, also known as a policyholder, in which the insurer agrees to indemnify the insured for specified losses, costs, or damage on specified terms and conditions in exchange of a certain premium amount paid by the insured. In a typical situation, when the insured suffers some loss for which he/she may have insurance the insured makes an insurance claim to request payment for the loss. It is to be appreciated for the purpose of the embodiments illustrated herein, the insurance policy is not to be understood to be limited to a residential or homeowners insurance policy, but can be for a commercial, umbrella, and other insurance policies known by those skilled in the art.

As used herein, "insured property" means a dwelling, other buildings or structures, personal property, or business property that may be covered by an insurance policy.

As used herein, "modification related data" means data or information relating to repairs, additions, remodeling, improvements, or other changes to insured property which may or may not be covered by an insurance policy. Modification related data may or may not be relevant to an insurance claim or decisions about underwriting, pricing, coverage, or other terms or conditions under which an insurance company may be willing to insure particular property, including buildings, other structures, and personal or business property.

Turning now descriptively to the drawings, in which similar reference characters denote similar elements throughout the several views, FIG. 1 depicts an exemplary communications network 100 in which below illustrated embodiments may be implemented.

It is to be understood a communication network 100 is a geographically distributed collection of nodes interconnected by communication links and segments for transporting data between end nodes, such as personal computers, work stations, smart phone devices, tablets, televisions, sensors and or other devices such as automobiles, etc. Many types of networks are available, with the types ranging from local area networks (LANs) to wide area networks (WANs). LANs typically connect the nodes over dedicated private communications links located in the same general physical location, such as an insured property 300 or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

FIG. 1 is a schematic block diagram of an example communication network 100 illustratively comprising nodes/devices 101-108 (e.g., sensors 102, client computing devices 103, smart phone devices 105, servers 106, routers 107, switches 108 and the like) interconnected by various methods of communication. For instance, the links 109 may be wired links or may comprise a wireless communication medium, where certain nodes are in communication with other nodes, e.g., based on distance, signal strength, current operational status, location, etc. Moreover, each of the devices can communicate data packets (or frames) 142 with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
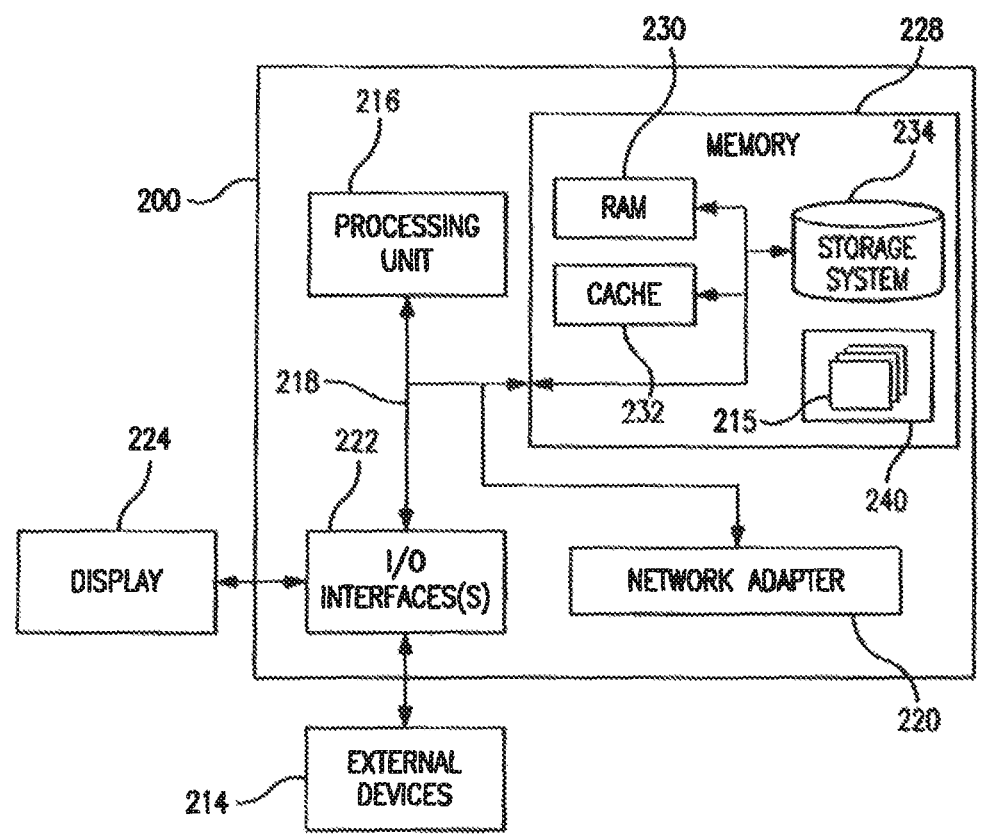
FIG. 2 illustrates a network computer device/node in accordance with an illustrated embodiment.

FIG. 2 is a schematic block diagram of an example network computing device 200 (e.g., one of network devices 101-108) that may be used (or components thereof) with one or more embodiments described herein, e.g., as one of the nodes shown in the network 100. As explained above, in different embodiments these various devices are configured to communicate with each other in any suitable way, such as, for example, via communication network 100.

Device 200 is only one example of a suitable system and is not intended to suggest any limitation as to the scope of use or functionality of embodiments of the invention described herein. Regardless, computing device 200 is capable of being implemented and/or performing any of the functionality set forth herein.

Computing device 200 is operational with numerous other general purpose or special purpose computing system environments or configurations. Examples of well-known computing systems, environments, and/or configurations that may be suitable for use with computing device 200 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed data processing environments that include any of the above systems or devices, and the like.

Computing device 200 may be described in the general context of computer system-executable instructions, such as program modules, being executed by a computer system. Generally, program modules may include routines, programs, objects, components, logic, data structures, and so on that perform particular tasks or implement particular abstract data types. Computing device 200 may be practiced in distributed data processing environments where tasks are performed by remote processing devices that are linked through a communications network. In a distributed data processing environment, program modules may be located in both local and remote computer system storage media including memory storage devices.

Device 200 is shown in FIG. 2 in the form of a general-purpose computing device. The components of device 200 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (iSA) bus, Micro Channel Architecture (MCA) bus, Enhanced ISA (EISA) bus, Video Electronics Standards Association (VESA) local bus, and Peripheral Component Interconnect (PCI) bus.

Computing device 200 typically includes a variety of computer system readable media. Such media may be any available media that is accessible by device 200, and it includes both volatile and non-volatile media, removable and non-removable media.

System memory 228 can include computer system readable media in the form of volatile memory, such as random access memory (RAM) 230 and/or cache memory 232. Computing device 200 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 215, such as insured property analyzer module 306 described below, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 215 generally carry out the functions and/or methodologies of embodiments of the invention as described herein.

Device 200 may also communicate with one or more external devices 214 such as a keyboard, a pointing device, a display 224, etc.; one or more devices that enable a user to interact with computing device 200; and/or any devices (e.g., network card, modem, etc.) that enable computing device 200 to communicate with one or more other computing devices. Such communication can occur via Input/Output (I/O) interfaces 222. Still yet, device 200 can communicate with one or more networks such as a local area network (LAN), a general wide area network (WAN), and/or a public network (e.g., the Internet) via network adapter 220. As depicted, network adapter 220 communicates with the other components of computing device 200 via bus 218. It should be understood that although not shown, other hardware and/or software components could be used in conjunction with device 200. Examples, include, but are not limited to: microcode, device drivers, redundant processing units, external disk drive arrays, RAID systems, tape drives, and data archival storage systems, etc.

FIGS. 1 and 2 are intended to provide a brief, general description of an illustrative and/or suitable exemplary environment in which embodiments of the below described present invention may be implemented. FIGS. 1 and 2 are exemplary of a suitable environment and are not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

Figure 3:
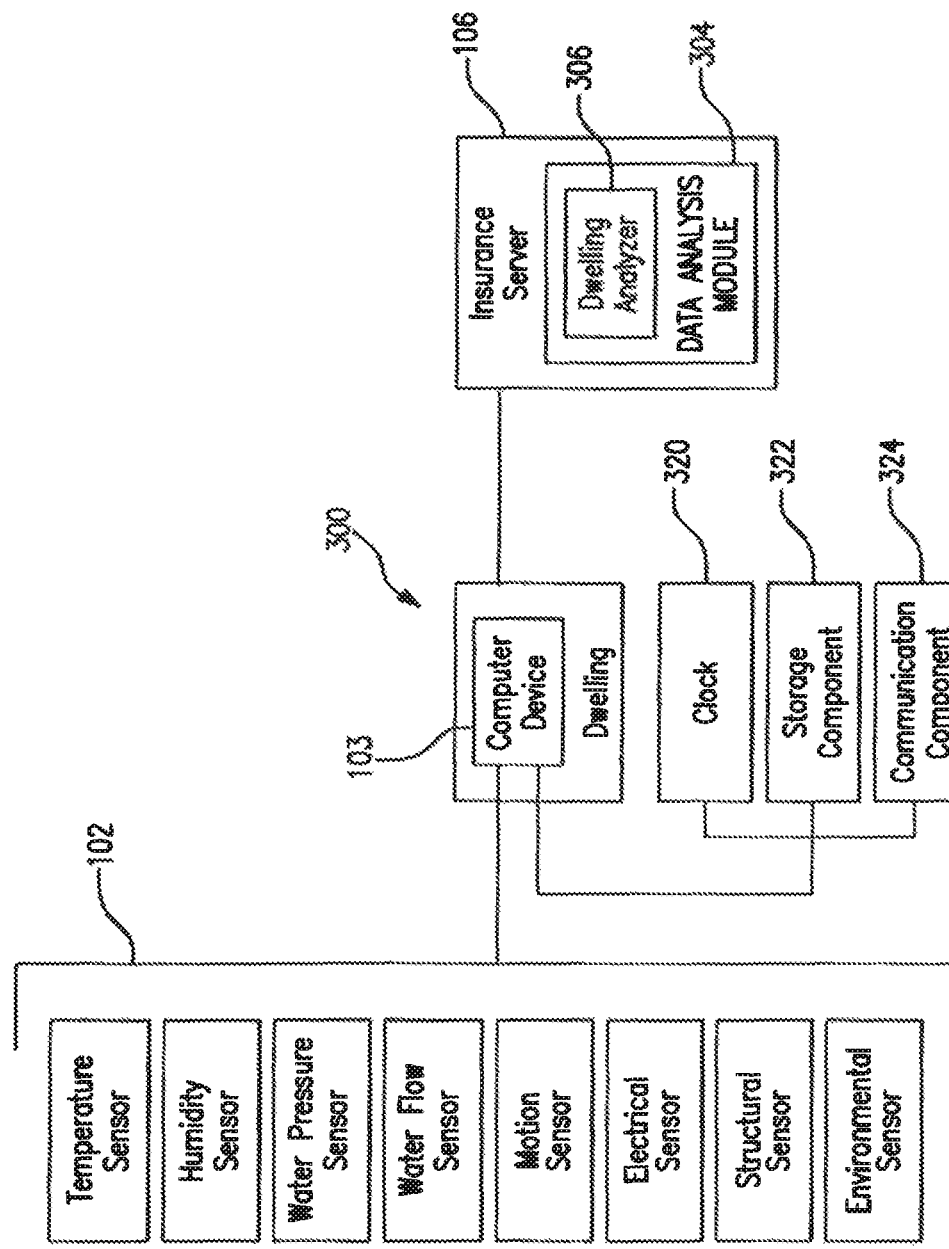
FIG. 3 is a block diagram of a building or other structure from which sensor data is captured for subsequent analysis in accordance with an illustrated embodiment.

With the exemplary communication network 100 (FIG. 1) and computing device 200 (FIG. 2) being generally shown and discussed above, description of certain illustrated embodiments of the present invention will now be provided. With reference now to FIG. 3, an example of an insured property 300 is shown which is to be understood to be any type of insured property structure (e.g., residential, commercial, retail, municipal, etc.) in which the capture and analysis of sensor data (102) is useful for the reasons at least described below. Insured property 300 preferably includes a computing device 103 for capturing data from a plurality of sensors 102 which capture data regarding various aspects of insured property 300, as further described below. It is to be understood insured property computing device 103 may be located in any location, and its position is not limited to the example shown.

Computing device 103 is preferably configured and operational to receive (capture) data from various sensors 102 regarding certain aspects (including functional and operational) of insured property 300 (described further below) and transmit that captured data to a remote server 106, via network 100. It is noted device 103 may perform analytics regarding the captured sensor data regarding insured property 300 and/or the remote server 106, preferably located or controlled by an insurance company/carrier, may perform such analytics, as also further described below. It is also to be understood in other embodiments, data from sensors 102 may be transmitted directly to remote server 106, via network 100, thus either obviating the need for insured property computing device 103 or mitigating its functionality to capture all data from sensors 102. It is also to be understood remote server 106 may be configured to send command signals to the one or more sensor devices 102 providing instructions regarding capture and transmission of certain insured property data.

In the illustrated embodiment of FIG. 3, insured property computing device 103 is shown coupled to various below described sensor types 102. Although various sensor types 102 are described below and shown in FIG. 3, the sensor types described and shown herein are not intended to be exhaustive as embodiments of the present invention may encompass any type of known or unknown sensor type which facilitates the purposes and objectives of the certain illustrated embodiments described herein. Exemplary sensor types include (but are not limited to):

Temperature sensor—configured and operational to preferably detect the temperature present at the insured property 300. For example, the temperature may rise and fall with the change of seasons and/or the time of day. A person may have a secondary home in a location that experiences low temperatures and is unoccupied for long stretches of time. The heater may malfunction and the temperature present at the insured property 300 may go below an acceptable level. The probes placed at various locations in and around the insured property 300 are preferably connected to device 103 by wire, or by wireless technology can send an alert to the person who owns the home or to the insurance company so that mitigation action can occur. Moreover, in the event of a fire, the temperature present at the insured property 300 may rise quickly–possibly to a level of extreme high heat. The temperature sensor may make use of probes placed at various locations in and around the insured property 300, in order to collect a representative profile of the temperature present at the insured property 300. These probes may be connected to device 103 by wire, or by a wireless technology. For example, if device 103 is positioned in the attic of the insured property 300, the temperature may be higher than the general temperature present in the insured property. Thus, probes placed at various locations (e.g., in the basement, on the various levels of a multi-level insured property 300, in different rooms that receive different amounts of sun, etc.), in order to obtain an accurate picture of the temperature present at the insured property. Moreover, device 103 may record both the indoor and outdoor temperature present at the insured property 300. For example, data about the indoor temperature, the outdoor temperature, and/or the differential between indoor and outdoor temperatures, may be used as part of some analysis model, and thus all of the different values could be stored. Device 103 may store an abstract representation of temperature (e.g., the average indoor temperature, as collected at all of the probes), or may store each temperature reading individually so that the individual readings may be provided as input to an analysis model. It is to be appreciated an insurance company can also use the information collected from device 103 to send to the homeowner targeted advice on how to save energy based upon the temperature at the insured property 300. For example, the energy sensor can determine that to hit a targeted energy use for the month the homeowner needs to set the temperature in the home at a different level. These devices preferably work together to save the homeowner electricity use.

Humidity sensor–configured and operational to preferably detect the humidity present at the insured property 300. Humidity sensor may comprise the humidity-detection hardware, or may employ one or more remote probes, which may be located inside and/or outside the insured property 300. Humidity readings from one or more locations inside and/or outside the insured property could thus be recorded by device 103. An example of this use of this sensor is that the humidity sensor 102 could detect that the humidity level in the home is over an acceptable range and send notice, either wired or wirelessly to device 103 so that the homeowner or insurance company can take an action. A homeowner may own an expensive art work or electronic equipment and need the humidity to stay at an acceptable range. The device 103 can determine that the humidity is over an acceptable range and send an alert to the homeowner or insurance company so that corrective action can occur.

Water Sensor(s)/Water pressure sensor(s)—configured and operational to preferably monitor water related conditions, including (but not limited to): the detection of water and water pressure detection, for instance in the plumbing system (including sewer lines, water lines, HVAC system, appliances, automatic fire suppression system, sump pump, and lawn sprinkler system) in the insured property 300. With regards to a water pressure sensor, it may have one or more probes attached to various locations of the insured property's 300 plumbing, and thus device 103 may record the pressure present in the plumbing, and/or any changes in that pressure. For example, plumbing systems may be designed to withstand a certain amount of pressure, and if the pressure rises above that amount, the plumbing system may be at risk for leaking, bursting, or other failure. An example of this is with a dishwasher. It could be know that a model of a dishwasher at insured property 300 should have a water pressure of X. If the washing machine's water pressure is higher or lower than it is supposed to, device 103 will collect this information and could send an alert to the homeowner or insurance company so that mitigation action can take place. Thus, device 103 may record the water pressure (and water flow) that is present in the plumbing system at various points in time. An analysis model could use the information about water pressure in various ways such as rating the insurance, tracking water pressure, and/or providing advice and guidance.

Water flow sensor–configured and operational to preferably monitor water flow rate in the plumbing system (including sewer lines, water lines, HVAC system, appliances, automatic fire suppression system, sump pump, and lawn sprinkler system) in the insured property 300. Water flow sensor may have one or more probes attached to various locations of the insured property's 300 plumbing, such as faucets, showerheads and appliances, and thus water flow sensor 103 may measure and/or record the amount of water flowing through the insured property's 300 water supply system. Thus, device 103 may record the water flow that is present in the plumbing system at various points in time. An analysis model could use the information about water flow in various ways such as rating the home insurance, tracking water consumption, or providing advice and guidance. The readings of the amount of water used at insured property 300 can be used to analyze and forecast an expected water bill. This can also be used for budgeting and finance management because a history of water usage at the insured property 300 or certain appliances can be measured and displayed to the homeowner or insurance company. These readings and usage can be provided to the owner so that he can budget X amount of money each month for the water bill. Also, the owner or insurer can track water use and determine based upon the rate of energy consumption that the owner is on a pace to use more or less water use than is budgeted. If the owner is on pace to use more water than is budgeted the insurance company can provide advice and guidance on how the owner can reduce water use. If the owner is on pace to use less water than is budgeted the insurance company can help the owner in insured property moving the unspent portion of the budget amount to a savings device like a CD or money market.

Leak detection sensor–configured and operational to preferably monitor the presence of leaks from gas and plumbing pipes both inside and outside the walls of the insured property 300. The leak detection sensor may have one or more probes attached to various locations of the insured property's 300 plumbing and piping (including sewer lines, water lines, HVAC system, appliances, automatic fire suppression system, sump pump, and lawn sprinkler system), and this device 103 may record the fact that there is a gas or water leak. An example of this is that a leak detection sensor can be placed behind the washing machine. If the hoses that connect the washing machine to the water line were to break the leak detection sensor would know that there was a water leak and notify the insured and/or the insurance company. The insured can also give prior authorization to the insurance company to act on their behalf to correct the water leak. For instance, call a plumber to turn off the water at the street when the leak detector activates and the insured does not respond to the leak detection sensor after a certain period of time. The leak detection sensors do not need to necessarily be placed around the appliance or pipe that they are intended to check for leaks. For example, an insured could place a sensor on the main water line that goes into the insured property 300 and this sensor could know by changes in pressure, temperature, etc. that there is a later or gas leak in the insured property 300—even if the leak was inside the walls and not viewable inside the home. An analysis model could use the information about how often the leak detection sensor alerts, whether the insured uses leak detection sensor(s), and where they are placed in various ways, such as rating the insurance, tracking water pressure, and/or providing advice and guidance.

Wind speed sensor–configured and operational to record the wind speed present at the insured property 300. For example, one or more wind sensors may be placed outside the insured property 300, at the wind speed and/or direction may be recorded at various points in time. Device 103 may record these wind speed and/or wind direction readings. The wind speed may be used by an analysis model for various purposes.

Motion sensor—configured and operational to sense motion in the insured property 300 to which device 300 is attached. Typically, insured property's 300 do not move significantly, except in the event of a catastrophe. Motion sensor may indicate that the insured property 300 is sliding down a hill (e.g., in the event of an extreme flood or mudslide), or is experiencing a measurable earthquake. A motion sensor may further include earth sensors for detecting sink holes and earth movement. In addition, a motion sensor may be configured and operational to sense the motion of objects within the insured property.

Electrical system sensor/analyzer configured and operational to assess the condition of the insured property's 300 electrical system. For example, potentiometers may be connected to various points in the insured property's 300 electrical system to measure voltage. Readings from the potentiometers could be used to determine if the voltage is persistently too high, or too low, or if the voltage frequently drops and/or spikes. Such conditions may suggest that the insured property 300 is at risk for fire. Other types of electrical measurements could be taken, such as readings of current flowing through the electrical system. These readings could help determine if an appliance is at risk of failure and damage. For example, it could be known that a model of water heater at insured property 300 consumes X amount of electricity. If the water heater starts consuming more electricity than it is supposed to device 103 will collect this information and could send an alert to the owner or insurance company so that mitigation action can take place. Still other types of electrical measurements could be determined include how energy is used and at what times of day it is used, etc. The readings of the amount of energy used at insured property 300 can be used to analyze and forecast an expected energy bill. This can also be used for budgeting and finance management because a history of energy usage at the insured property 300 or certain appliances can be measured and displayed to the owner or insurance company. These readings and usage can be provided to the owner so that he can budget X amount of money each month for the energy bill. Also, the owner or insurer can track energy use and determine based upon the rate of energy consumption that the owner is on a pace to use more or less energy use than is budgeted. If the homeowner is on pace to use more energy than is budgeted the insurance company can provide advice and guidance on how the owner can reduce energy use. If the owner is on pace to use less energy than is budgeted the insurance company can help the owner in making decisions about moving the unspent portion of the budget amount to a savings device like a CD or money market. Any type of data about the insured property's 300 electrical system could be captured by device 103. An analysis model could use the information about electrical energy in various ways such as rating the home insurance, tracking energy consumption, or providing advice and guidance.

Positional sensor configured and operational to record the position of device 103. For example, the positional sensor may be, or may comprise, a Global Positioning System (GPS) receiver, which may allow the position of device 103 to be determined. Or, as another example, positional sensor may use triangulation technology that communicates with fixed points (such as wireless communication towers) to determine its position. While an insured property 300 normally does not move, positional sensor may allow device 103 to be recovered in the event of a catastrophe. For example, if an insured property 300 explodes, or is otherwise catastrophically damaged, device 103 may be propelled to an unknown location. Positional sensor may indicate the geographical area of an insured property 300 which an analysis model could use in various ways. Positional sensor may record the position of device 103, which device 103 could communicate to an external source, thereby allowing device 103 to be found. Another example of positional sensors is for the location, number, and use of the 102 sensors. The insurance company could provide different insurance rates or incentives based on where the sensors are placed in the insured property 300. The insurance company could also use the location of the 102 sensors to provide advice and guidance about how to reduce the chance of a loss or reduce energy/water use.

Structural sensor–configured and operational to preferably detect various structural conditions relating to insured property 300. A structural sensor may comprise detection hardware, or may employ one or more remote probes, which may be located inside and/or outside the insured property 300. Conditions recorded by structural sensor may include (but are not limited to) the condition of the wall structure, floor structure, ceiling structure and roof structure of insured property 300, which may be achieved via: load bearing detectors; components which measure the slope of a floor/wall/ceiling; carpet conditions (e.g., via nano sensor) or any other components functional to detect such conditions. Structural readings from one or more locations inside and/or outside the insured property 300 could thus be recorded by device 103 and used by an analysis model in various ways.

Environmental Sensor–configured and operational to preferably detect various environmental conditions relating to insured property 300. An environmental sensor may comprise detection hardware, or may employ one or more remote probes, which may be located inside and/or outside the insured property 300. Conditions recorded by an environmental sensor may include (but are not limited to) the air quality present in insured property 300, the presence of mold/bacteria/algae/lead paint or any contaminant adverse to human health (whether airborne or attached to a portion of the structure of insured property 300). Such environmental readings from one or more locations inside and/or outside the insured property 300 could thus be recorded by device 103 and used by an analysis model in various ways.

Appliance Sensor—configured and operational to preferably detect various operating parameters relating to appliances within an insured property 300. Examples of appliances include (but are not limited to) all kitchen appliances (e.g., refrigerator, freezer, stove, cooktop, oven, grill, dishwasher, etc.); HVAC components (air conditioner, heating system, air handlers, humidifiers/de-humidifiers, etc.), water purification system, media entertainment system (e.g., televisions), networking components (routers, switches, extenders, etc.) electrical generator system, pool filtration and heating system, garage door openers, sump pump and water well system, septic tank system, etc. An appliance sensor may comprise detection hardware, or may employ one or more remote probes, which may be located inside and/or outside the insured property 300 functional to detect certain operating parameters of appliances. Operating parameters detected by an appliance sensor 300 may include (but are not limited to): the operating efficiency of an appliance (energy usage, output performance); the time an appliance operates, the age of an appliance; maintenance needs of an appliance (e.g., change a filter component or schedule a periodic examination/tune-up); and repair needs of an appliance (which may also include the identification of parts needed). An example of this is with a dishwasher. It could be known that a model of a dishwasher at insured property 300 should use X amount of water per minute when in use. If the washing machine's water use is higher or lower than it is supposed to be, device 103 will collect this information and could send an alert to the owner or insurance company so that mitigation action can take place. Such appliance readings from one or more insured property appliances could thus be recorded by device 103 and used by an analysis model in various ways.

Image (camera) Sensor–configured and operational to obtain image information regarding the interior, exterior, and contents of the 300 as well as the property on which the structure is located. Examples of image sensors include (but are not limited to) visible light cameras, infrared cameras, two-dimensional (2D) cameras, three-dimensional (3D) cameras, thermal image cameras, radar-capable sensors, sensors that detect other wavelengths, and/or any combination thereof.

With exemplary sensors 102 identified and briefly described above, and as will be further discussed below, it is to be generally understood sensors 102 preferably record certain data parameters relating to products and services provided by an insurance carrier, such as USAA, to determine the status of home repairs/remodeling projects as described below. It is to be understood and appreciated the aforementioned sensors 102 may be configured as wired and wireless types integrated in a networked environment (e.g., WAN, LAN, WiFi, 802.11X, 3G, LTE, etc.), which may also have an associated IP address. It is to be further appreciated the sensors 102 may consist of internal sensors located within the structure of insured property 300; external sensors located external of the structure of insured property 300; sound sensors for detecting ambient noise (e.g., for detecting termite and rodent activity, glass breakage, intruders, etc.). It is additionally to be understood and appreciated that sensors 102 can be networked into a central computer hub (e.g., device 103) in an insured property to aggregate collected sensor data packets. Aggregated data packets can be analyzed in either an insured property computer system (e.g., device 103) or via an external computer environment (e.g., server 106). Additionally, it is to be understood data packets collected from sensors 102 can be aggregated in insured property computing device 103 and sent as an aggregated packet to server 106 for subsequent analysis whereby data packets may be transmitted at prescribed time intervals (e.g., a benefit is to reduce cellular charges in that some insured properties 300 may not have Internet access or cellular service is backup when insured property Internet service is nonfunctioning).

In accordance with an illustrated embodiment, in addition to the aforementioned, the sensors 102 being utilized relative to insured property 300, insured property computing device 103 may additionally be coupled to a Clock 320 which may keep track of time for device 103, thereby allowing a given item of data to be associated with the time at which the data was captured. For example, device 103 may recurrently detect various environmental conditions relating to insured property 300, recurrently capture images of various portions of the structure of insured property 300, etc., and may timestamp each reading and each image. The time at which the readings are taken may be used to reconstruct events or for other analytic purposes, such as those described below. For example, the environmental sensor may measure the presence of mold, bacteria/algae/lead paint or any contaminant adverse to human health. The timestamps on air quality readings taken after a recent water incident may allow it to be determined how long does it take for mold to grow after water damage occurs.

A storage component 322 may further be provided and utilized to store data readings and/or timestamps in device 103. For example, storage component 322 may comprise, or may otherwise make use of, magnetic or optical disks, volatile random-access memory, non-volatile random-access memory, or any other type of storage device. There may be sufficient data storage capacity to store several days or several weeks worth of readings. For example, the insured property 300 improvement project might last for a day, a week, or several weeks. Storage component 322 might have sufficient storage capacity to allow daily images and readings to be stored, thereby allowing forensic reconstruction of how the repairs affected the insured property 300 during the full time that the insured property 300 was under reconstruction/remodeling.

A communication component 324 may further be provided and utilized to communicate recorded information from insured property computing device 103 to an external location, such as computer server 106, which may be associated with an insurance carrier such as USAA. Communication component 324 may be, or may comprise, a network communication card such as an Ethernet card, a WiFi card, or any other communication mechanism. However, communication component 324 could take any form and is not limited to these examples. Communication component 324 might encrypt data that it communicates, in order to protect the security and/or privacy of the data. Communication component 324 may communicate data recorded by device 103 (e.g., data stored in storage component 322) to an external location, such as server 106. For example, server 106 may be operated by an insurance company, and may collect data from insured property computing device 103 to learn about risks and repair needs and other analytics relative to structural improvement of insured property 300 in which device 103 is located. Communication component 324 may initiate communication sessions with server 106. Or, as another example, server 106 may contact device 103, through communication component 324, in order to receive data that has been stored by device 103. Additionally, data from sensors 102, clock 320 and/or storage component 322 may be communicated directly to server 106, via network 100, thus obviating or mitigating the need for insured property computing device 103.

In the example of FIG. 3, communication component 324 (which is shown, in FIG. 3, as being part of, or used by, insured property computing device 103) communicates data to server 106. Server 106 may comprise, or otherwise may cooperate with, a data analysis module 304, which may analyze data in some manner. Data analysis module 304 may comprise various types of sub-modules, such as insured property analyzer 306. In general, insured property analyzer 306 may perform an analysis of collected data regarding various attributes of insured property 300, such as, for example, but not limited to, structural condition of the insured property 300 and environmental conditions detected in the vicinity of the insured property 300. In various embodiments of the present invention, insured property analyzer 306 may perform a post hoc analysis, such as that used to understand the details of how an insured property 300 was damaged or destroyed during a hurricane, a fire, etc. Moreover, insured property analyzer 306 may analyze data to assess the risk of damage related to an insured property improvement project, enhance loss mitigation for an insurance carrier (e.g., push data to one or more third parties in real-time from insured property 300 for maximizing preventable losses), determine repair needs for insured property 300, and the like.

Figure 4:
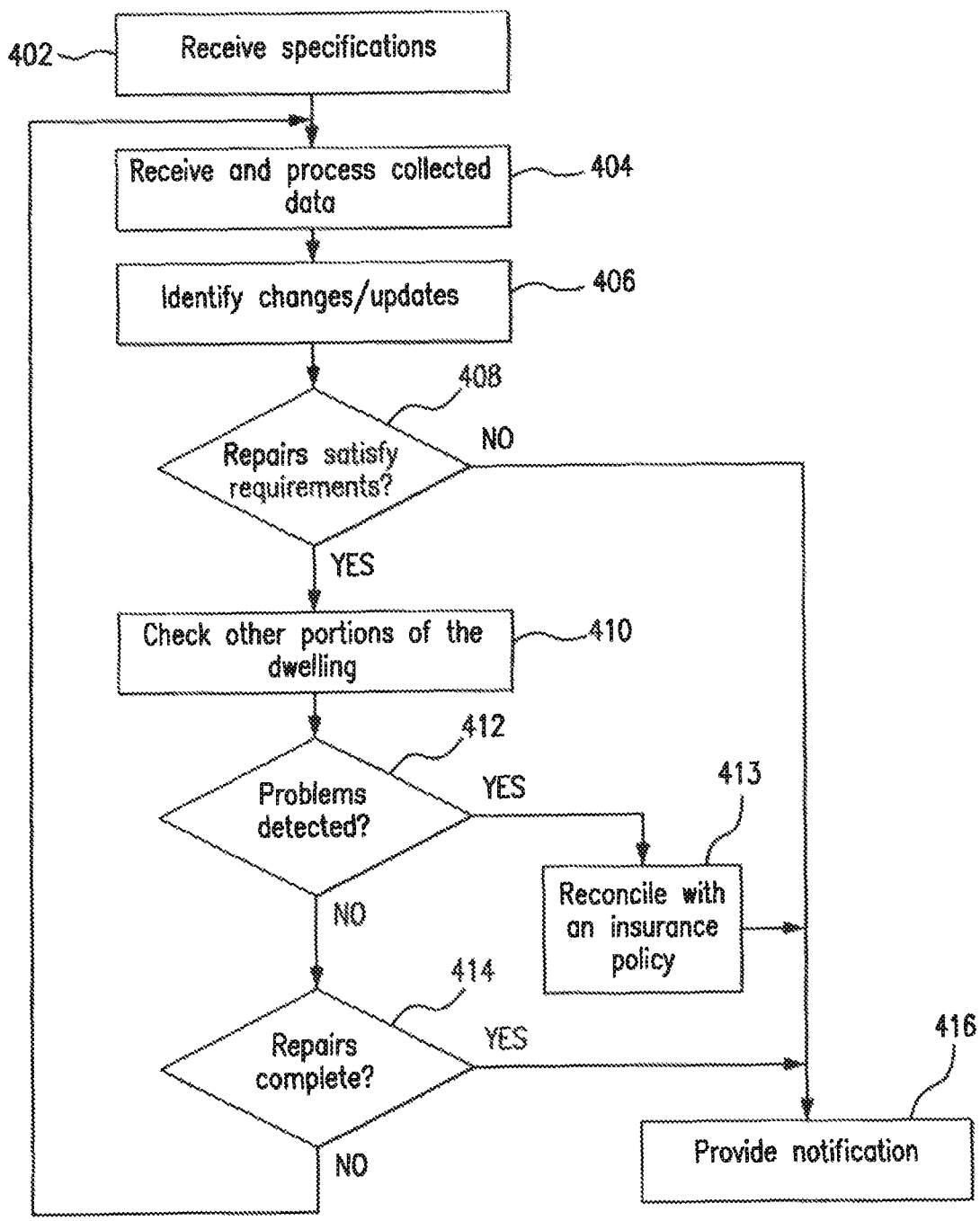
FIG. 4 is a flow diagram of operational steps of the building or other structure analyzer module of FIG. 3 in accordance with an illustrated embodiment.

FIG. 4 shows, in the form of a flow chart, exemplary operational steps of the insured property analyzer 306. Before turning to description of FIG. 4, it is noted that the flow diagram shown therein is described, by way of example, with reference to components shown in FIGS. 1-3, although these operational steps may be carried out in any system and are not limited to the scenario shown in the aforementioned figures. Additionally, the flow diagram in FIG. 4 shows an example in which operational steps are carried out in a particular order, as indicated by the lines connecting the blocks, but the various steps shown in these diagrams can be performed in any order, or in any combination or sub-combination.

In an embodiment of the present invention, exemplary operational steps described below may be carried out by the insured property analyzer 306 in order to monitor the progress of a insured property improvement project based on captured informatics sensor data. It is noted that the insured property improvement project may comprise insured property repairs relating to damage associated with a portion of the insured property, such as a roof, windows, chimney, and the like. In addition, the insured property improvement project may comprise a remodeling project (i.e., replacing exterior siding, replacing an entry door, extending the heating and air conditioning, improving wiring and lighting, and the like) associated with the insured property 300.

With reference to FIG. 4, at 402, insured property analyzer 306 preferably receives specifications related to the insured property improvement project, for example, from computing device 103. In an embodiment of the present invention, the specifications document may include one or more requirements related to the insured property improvement project. These requirements may identify, for instance, insured property modification needs, insured property maintenance needs, insured property repair needs, and the like, insured property modifications needs may include minor or major modifications to any portion of the insured property 300 to improve safety, accessibility, structural integrity, overall condition, appearance, and/or the quality of life. Insured property modifications may include, but are not limited to, replacing door handles or faucets, installing carpeting, modifying sinks or cabinets, and the like. Another example of this could be that a combustible material is too close to a heating source and has a risk of starting a fire. Insured property maintenance may include, but is not limited to, changing furnace and/or air conditioner filters and replacing appliances, such as air conditioners, garbage disposals, washers and dryers. Insured property repair needs can include, but are not limited to, repairing stairs, roofs, railings, and the like. The aforementioned specifications may further include information indicative of a degree of damage associated with the insured property 300, repair operating procedures, and the cost of the required services, such as material and installation expenses.

In an embodiment of the present invention, the specifications may include information related to an insurance policy associated with the insured property 300. If a specific insurance policy is identified, insured property analyzer 306 may retrieve more detailed information from one or more data storage devices (not shown in FIG. 3), which may be communicatively coupled to server 106 operated by an insurance company, insured property analyzer 306 may utilize the retrieved data to determine which of the repair/modification needs listed in the specifications document will be covered by the corresponding insurance policy. It is to be appreciated an insurance company may also include information related to an insurance policy associated with the insured property 300 to determine if the insurance company desires to make the insured property modification needs, insured property maintenance needs, insured property repair needs, and the like conditions for whether it wants to provide insurance to the insured, whether it wants to continue to provide insurance to the insured, or whether it wants to make the modification/maintenance/repair needs a condition for renewal or new issue of the policy at the insured property 300 or other underwriting or pricing decisions.

At 404, insured property analyzer 306 preferably collects data from sensors 102. In an embodiment of the present invention, this step may involve computing device 103 periodically contacting (via network 100), at prescribed time intervals, data analyzer component 304 running on server 106 to send accumulated data. In an alternative embodiment, contact between the insured property computing device 103 and insured property analyzer 306 may be initiated when the insured property analyzer 306 contacts the insured property computing device 103. Following the initial contact, insured property analyzer 306 may receive data from the insured property computing device 103. It is to be understood data packets collected from sensors 102 can be aggregated in insured property computing device 103 and send as an aggregated packet to insured property analyzer 306 for subsequent analysis.

In addition, at 404, insured property analyzer 306 preferably processes the informatics data collected by a plurality of sensors 102 to assess various conditions indicative of a status of the insured property improvement project. In various embodiments of the present invention, the plurality of sensors 102 measuring and/or collecting informatics data may include one or more of image sensors, structural sensors, temperature sensors, humidity sensors, environmental sensors, and so on. As previously indicated, upon the insured property improvement project commencement, insured property analyzer 306 may conduct a daily analysis to monitor progress and/or to verify compliance with the project specifications, as described below.

In another non-limiting embodiment, sensors can determine if recoverable depreciation in a claim for a covered loss can be provided to the insured. An example of how this could occur is a sensor 102 can send notification to insured property analyzer 306 the insured has replaced, repaired or maintained an item in question with like kind and quality or item(s) of similar quality and usefulness. When this happens, the insurance company is notified and can provide the insured recoverable depreciation.

At 406, insured property analyzer 306 preferably identifies the most recent repairs/modifications based on the latest informatics data. In an embodiment of the present invention, insured property analyzer 306 may periodically take images (snapshots) of one or more portions of the insured property 300 requiring repairs, modifications, and the like. For example, insured property analyzer 306 may determine whether an entry door has been replaced by comparing the latest snapshot capturing an entry door with respective older snapshots. As another non-limiting example, this step may further involve monitoring structural condition of the insured property 300. For instance, insured property analyzer 306 may identify one or more structural changes by analyzing the condition of the wall structure, floor structure, ceiling structure and roof structure of the insured property 300. In one implementation, insured property analyzer 306 may perform this identification by comparing latest measurements of the slope of a floor/wall/ceiling with previously taken measurements. It is to be appreciated, this information can be used to assist in claims settlement after a claim in regards to recoverable depreciation in a claim for a covered loss.

It is to be understood an insurance company can use the information from insured property analyzer 306 for whether the insured is or has made changes or updates to the insured property 300 and use this information for things like underwriting acceptability, pricing, and as a condition for renewal of the policy.

At 408, insured property analyzer 306 may determine whether the one or more identified changes related to the one or more conditions associated with the insured property improvement project satisfy one or more predefined requirements. In other words, in this step insured property analyzer 306 may determine whether the performed repairs/modifications meet the requirements included in the specification document (received at 402). For example, insured property analyzer 306 may determine whether appropriate materials were used to perform repairs. In another example, if one of the requirements listed in the specifications necessitated a repair of a broken window, insured property analyzer 306 may determine whether the broken window has been replaced. As mentioned above, this could assist to determine if recoverable depreciation in a claim for a covered loss can be provided to the insured.

In response to determining that the performed repairs/modifications comply with the requirements (step 408, yes branch), at 410, insured property analyzer 306 preferably checks other portions of the insured property 300 (including utility systems) within the insured property 300 that may have been affected by the performed repairs/modifications. The utility systems, may include, but are not limited to, electrical wiring, plumbing, heating, ventilation, and the like. For instance, if insured property analyzer 306 determines that one of the plumbing appliances was recently replaced, insured property analyzer 306 may measure and/or record the amount of water pressure present in the insured property's 300 water supply system and/or any changes in that pressure. In some insured properties 300 plumbing systems may be designed to withstand a certain amount of pressure, and if the pressure rises above that amount, the plumbing system may be at risk for leaking, bursting, or other failure. Thus, at 410, insured property analyzer 306 may verify that performed repairs will not cause future damage to the insured property 300. Similarly, if any of the kitchen appliances have been replaced during the insured property improvement project, insured property analyzer 306 may assess the condition of the insured property's electrical system. Electrical system readings could be used to determine if the voltage is persistently too high, or too low, or if the voltage frequently drops and/or spikes. Such conditions may suggest that the insured property 300 is at risk for fire.

It is to also be appreciated an insurance company can use the information from insured property analyzer 306 for whether the insured is or has made changes or updates to the insured property 300 and use this information for things like underwriting acceptability, pricing, and as a condition for renewal of the policy.

If the assessment performed at 410 detects any additional problems (step 412, yes branch), insured property analyzer 306 may determine next (at 413) whether the detected issues are covered by the insurance policy associated with the insured property 300. This step may further involve determining whether the detected issues require immediate repairs and/or temporary repairs to mitigate or prevent further damage to the insured property 300. If so, insured property analyzer 306 may provide a corresponding notification, at 416, as described below. According to an embodiment of the present invention, insured property analyzer 306 preferably amends the specification document related to the insured property improvement project to include newly identified repair requirements if the repairs are covered by the corresponding insurance policy.

In response to detecting no additional problems/issues (step 412, no branch), at 414, insured property analyzer 306 may determine next whether the insured property improvement project has been completed. In an embodiment of the present invention, insured property analyzer 306 may verify that all requirements included in the specification have been satisfied. If the insured property improvement project has not been completed (step 414, no branch), insured property analyzer 306 may return back to step 404 in order to receive and process next set of collected informatics data after a set period of time. In response to determining that the insured property improvement project has been completed (step 414, yes branch), insured property analyzer 306 may provide a corresponding status notification.

As mentioned above, at 416, insured property analyzer 306 preferably provides a notification indicating a status of the insured property improvement project based on captured informatics sensor data. It is to be appreciated that insured property analyzer 306 may be configured to electronically deliver all notifications. The notification can be anything that advises a policy holder, device, or computer system of the current status of the insured property improvement project, including but not limited to, a display of text on a local display screen, a message in an email sent to a local or remote computer, a text message, a communication to a remote computer system. It is to be also understood and appreciated that insured property analyzer 306 may be configured and operational to integrate with policy holder's communicative computing devices (e.g., smart phones (via an app), computers, tablets, smart TV's, vehicle communication systems, kitchen communication systems, etc.) for sending such notifications regarding insured property repairs/modifications. In an embodiment of the present invention, if insured property analyzer 306 determines that performed repairs do not comply with the requirements (step 408, no branch), the generated notification may indicate that one or more requirement has not been satisfied by the repairs. If insured property analyzer 306 detects any issues/damage that may have been caused by the performed repairs/modifications (step 412, no branch), the generated notification may identify the detected problems and may further indicate whether suggested repairs are covered by the insurance policy associated with the insured property 300. If at step 414 (yes branch) insured property analyzer 306 determines that the improvement project has been completed, the notification generated at 416 may include a status indicative of the successful completion of the project. In various embodiments, the notification generated by insured property analyzer 306 may include one or more images of one or more portions of the insured property 300. As mentioned above, the information collected by the insured property analyzer 306 can determine whether the repairs to the insured property 300 were made and can determine if recoverable depreciation in a claim for a covered loss can be provided to the insured.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A system, comprising:
a computer server coupled to a communication device via a network, and programmed to:
receive modification specification data indicative of modifications to be made to a property;
receive first sensor data captured in a first data capture regarding one or more attributes of a property, wherein the first sensor data indicates one or more first attributes associated with the modification specification data of the property;
generate a command signal to capture and transmit second sensor data of a second data capture of a portion of the property to which modifications are made, whereby the command signal activates a sensor by commanding the sensor to capture a reading, the command signal further altering a data reading frequency of the sensor;
in response to transmitting the command signal to the sensor, receive the second sensor data;
identify modifications made to the property, based upon comparing the first sensor data and the second sensor data;
perform a determination as to whether proper modifications were made to the property by comparing the identified modifications to the modification specification data, wherein the identified modifications comprise one or more slope differences of a floor, wall, ceiling, or any combination thereof; and
transmit an electronic notification to a computing device associated with the property indicating whether the proper modifications were made to the property, based on the determination.

2. The system of claim 1, wherein the computer server is programmed to: determine if recoverable depreciation regarding an insurance claim can be provided based upon the determination.

3. The system of claim 1, comprising:
a plurality of sensor devices each configured to capture a different attribute of the property, each sensor device having a transmitter with an associated Internet Protocol (IP) address coupled to a wireless network for transmitting a corresponding attribute.

4. The system of claim 3, wherein the plurality of sensor devices comprise one or more of the following detection sensor devices: electrical; structural; and camera.

5. The system of claim 1, wherein the received modification specification data relates to property repairs associated with damage to the property.

6. The system as recited in claim 1, wherein the computer server is further programmed to determine a material used in connection with the modifications made to the property.

7. The system of claim 1, comprising:
a data storage component wirelessly coupled to each of a plurality of sensors devices via a transmitter for each of the sensor devices wherein the data storage component is configured to aggregate captured data regarding different attributes of the property received from each of the sensor devices for provision to the computer server.

8. The system of claim 7, comprising
a communication component coupled to the data storage component configured to encrypt and transmit the captured data via a network.

9. A tangible, non-transitory, computer-readable medium, comprising computer-readable instructions that, when executed by one or more processors of a computer, cause the computer to:
receive modification specification data indicative of modifications to be made to a property;
receive first sensor data captured in a first data capture regarding one or more attributes of a property, wherein the first sensor data indicates one or more first attributes associated with the modification specification data of the property;
generate a command signal to capture and transmit second sensor data of a second data capture of a portion of the property to which modifications are made, whereby the command signal activates a sensor by commanding the sensor to capture a reading, the command signal further altering a data reading frequency of the sensor;
in response to transmitting the command signal to the sensor, receive the second sensor data;
identify modifications made to the property, based upon comparing the first sensor data and the second sensor data;
perform a determination as to whether proper modifications were made to the property by comparing the identified modifications to the modification specification data, wherein the identified modifications comprise one or more slope differences of a floor, wall, ceiling, or any combination thereof; and
transmit an electronic notification to a computing device associated with the property indicating whether the proper modifications were made to the property, based on the determination.

10. The computer-readable medium of claim 9, comprising computer-readable instructions that, when executed by the one or more processors, cause the computer to:
determine if recoverable depreciation regarding an insurance claim can be provided based upon the determination.

11. The computer-readable medium of claim 9, comprising computer-readable instructions that, when executed by the one or more processors, cause the computer to:
receive the first sensor data, the second sensor data or both, sourced from a plurality of sensor devices each configured to capture a different attribute of the property, each sensor device having a transmitter with an associated Internet Protocol (IP) address coupled to a wireless network for transmitting a corresponding attribute data.

12. The computer-readable medium of claim 11, wherein the plurality of sensor devices comprise one or more of the following detection sensor devices: electrical; structural; and camera.

13. The computer-readable medium of claim 9, wherein the received modification specification data relates to property repairs associated with damage to the property.

14. The computer-readable medium of claim 9, comprising computer-readable instructions that, when executed by the one or more processors, cause the computer to:
determine a material used in connection with the modifications made to the property.

15. A computer-implemented method, comprising:
receiving modification specification data indicative of modifications to be made to a property;
receiving first sensor data captured in a first data capture regarding one or more attributes of a property, wherein the first sensor data indicates one or more first attributes associated with the modification specification data of the property;
generating a command signal to capture and transmit second sensor data of a second data capture of a portion of the property to which modifications are made, whereby the command signal activates a sensor by commanding the sensor to capture a reading, the command signal further altering a data reading frequency of the sensor;
in response to transmitting the command signal to the sensor, receiving the second sensor data;
identifying modifications made to the property, based upon comparing the first sensor data and the second sensor data;
performing a determination as to whether proper modifications were made to the property by comparing the identified modifications to the modification specification data, wherein the identified modifications comprise one or more slope differences of a floor, wall, ceiling, or any combination thereof; and
transmitting an electronic notification to a computing device associated with the property indicating whether the proper modifications were made to the property, based on the determination.

16. The computer-implemented method of claim 15, comprising:
determining if recoverable depreciation regarding an insurance claim can be provided based upon the determination.

17. The computer-implemented method of claim 15, comprising:
determine a material used in connection with the modifications made to the property.

* * * * *